(12) United States Patent
Okada

(10) Patent No.: US 10,466,438 B2
(45) Date of Patent: Nov. 5, 2019

(54) LENS BARREL AND IMAGE-CAPTURING APPARATUS

(71) Applicant: CANON KABUSHIKI KAISHA, Tokyo (JP)

(72) Inventor: Tadanori Okada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 37 days.

(21) Appl. No.: 15/696,435

(22) Filed: Sep. 6, 2017

(65) Prior Publication Data
US 2018/0074285 A1 Mar. 15, 2018

(30) Foreign Application Priority Data

Sep. 12, 2016 (JP) .................................. 2016-177220

(51) Int. Cl.
| | | |
|---|---|---|
| G02B 27/00 | (2006.01) | |
| G02B 7/14 | (2006.01) | |
| G02B 5/00 | (2006.01) | |
| G02B 7/02 | (2006.01) | |
| H04N 5/225 | (2006.01) | |

(52) U.S. Cl.
CPC ............. *G02B 7/14* (2013.01); *G02B 5/003* (2013.01); *G02B 7/022* (2013.01); *H04N 5/2254* (2013.01); *G02B 5/005* (2013.01)

(58) Field of Classification Search
CPC .......... G02B 5/00; G02B 5/003; G02B 5/005; G02B 7/022; G02B 7/02; G02B 7/04; G02B 7/08; G02B 7/14; G02B 7/102; G02B 3/10; G02B 13/34; G02B 17/04; G02B 17/14; G02B 27/646; G02B 9/02; G02B 9/14; H04N 5/2254
See application file for complete search history.

(56) References Cited

U.S. PATENT DOCUMENTS

| 8,928,995 B2 | 1/2015 | Koga et al. |
|---|---|---|
| 2012/0200768 A1* | 8/2012 | Ito ............................ G02B 7/08 348/374 |

FOREIGN PATENT DOCUMENTS

| JP | 2007264017 A | 10/2007 |
|---|---|---|
| JP | 2013003178 A | 1/2013 |
| JP | 2013037307 A | 2/2013 |
| JP | 2013050701 A | 3/2013 |
| JP | 2016009141 A | 1/2016 |

* cited by examiner

*Primary Examiner* — Mustak Choudhury
(74) *Attorney, Agent, or Firm* — Rossi, Kimms & McDowell LLP

(57) ABSTRACT

The lens barrel includes an image-capturing lens unit, a mount portion including a mount member connectable to an image-capturing apparatus, and protrusion portions provided in the mount portion at multiple positions in a circumferential direction of the lens barrel. Each protrusion portion protrudes to an image side further than an image-side lens surface of a final lens disposed at a most image-side position in the image-capturing lens unit. The mount portion includes, inside the protrusion portions in a radial direction of the lens barrel, light-shielding portions capable of shielding light passing though the image-side lens surface toward inner circumferential surfaces of the protrusion portions.

9 Claims, 4 Drawing Sheets

LENS BARREL AND IMAGE-CAPTURING APPARATUS

BACKGROUND OF THE INVENTION

Field of the Invention

The present invention relates to a lens barrel holding an image-capturing lens unit, and relates to an image-capturing apparatus provided with the lens barrel.

Description of the Related Art

An interchangeable lens has been proposed that is used by being connected through its mount portion to an image-capturing apparatus such as a digital camera and a video camera, and in which a final lens disposed at a most image-side position in its image-capturing lens unit has an image-side lens surface protruding to an image side further than a mount surface of the mount portion. The mount portion of such an interchangeable lens is provided with, in order to protect the image-side lens surface of the final lens when a user stands the interchangeable lens with its final lens side down on a desk or a table, a lens-protective protrusion portion protruding to the image side further than the image-side lens surface of the final lens and extending in a circumferential direction of the interchangeable lens.

Japanese Patent Laid-Open Nos. 2013-050701 and 2013-037307 each disclose an interchangeable lens including such a lens-protective protrusion portion.

However, a larger image-side protrusion amount of the final lens makes it necessary to increase a protrusion amount of the lens-protective protrusion portion, which makes it necessary to increase a radial thickness of the lens-protective protrusion portion to keep its strength. This results in an increase in space occupied by the lens-protective protrusion portion in the mount portion.

The space in the mount portion has a limitation relating to the connection to a mount portion of the image-capturing apparatus, and thereby the space for providing the lens-protective protrusion portion is limited. Thus, it may be impossible to provide the lens-protective protrusion portion having a sufficient size. Furthermore, such a large-sized lens-protective protrusion portion may reflect light at its inner circumferential surface, and thereby an unnecessary light such as ghost is generated in the image-capturing apparatus.

SUMMARY OF THE INVENTION

The present invention provides a lens barrel and an image-capturing apparatus including the lens barrel each capable of, while providing a protrusion portion for protecting a final lens, reducing generation of an unnecessary light due to reflection of light at the protrusion portion.

The present invention provides as an aspect thereof a lens barrel including an image-capturing lens unit, a mount portion including a mount member connectable to an image-capturing apparatus, and protrusion portions provided in the mount portion at multiple positions in a circumferential direction of the lens barrel, each protrusion portion protruding to an image side further than an image-side lens surface of a final lens disposed at a most image-side position in the image-capturing lens unit. The mount portion includes, inside the protrusion portions in a radial direction of the lens barrel, light-shielding portions capable of shielding light passing though the image-side lens surface toward inner circumferential surfaces of the protrusion portions.

The present invention provides as an aspect thereof an image-capturing apparatus including the above lens barrel.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 1:
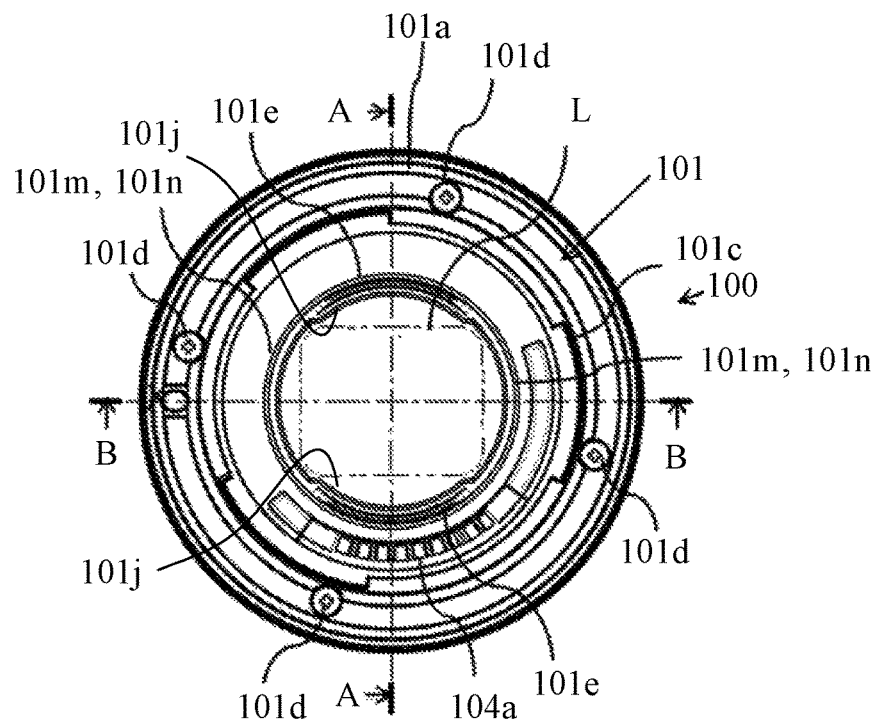
FIG. 1 illustrates a lens barrel that is an embodiment of the present invention when viewed from an image side.
Figure 2:
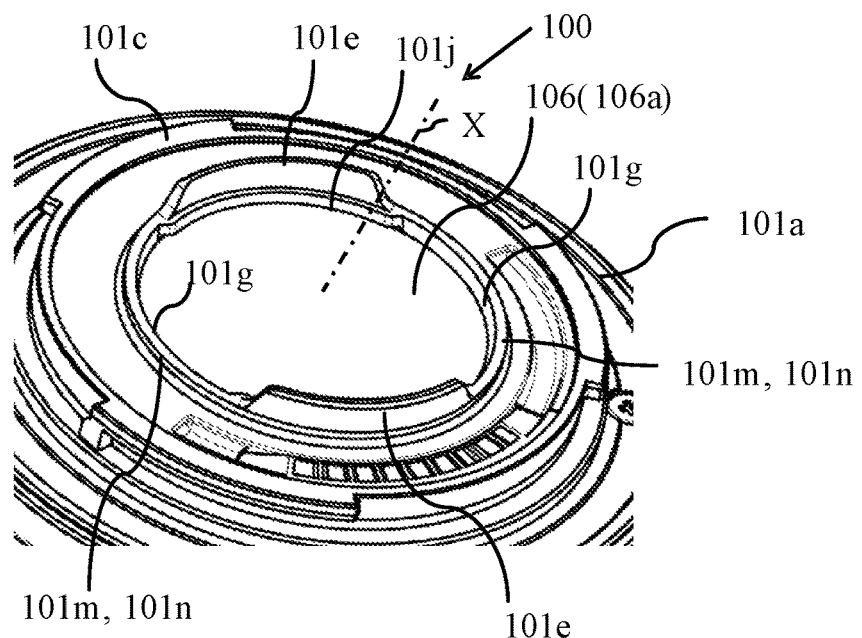
FIG. 2 is a perspective view of the lens barrel.
Figure 3:
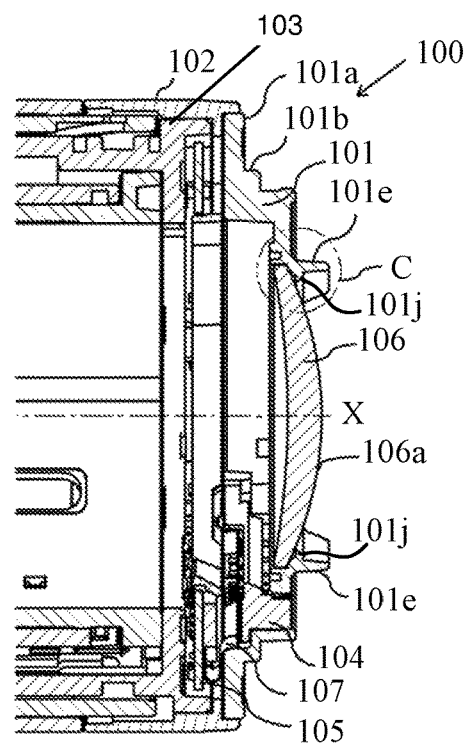
FIG. 3 is a sectional view of the lens barrel illustrated in FIG. 1 when cut along an A-A line.
Figure 4:
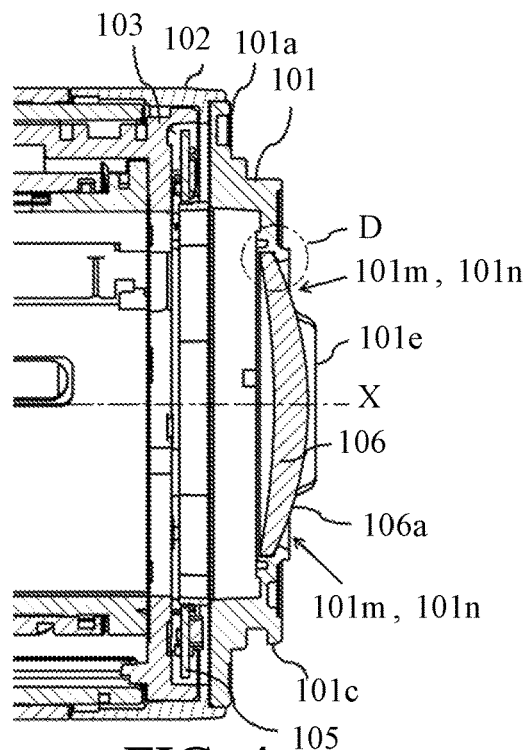
FIG. 4 is a sectional view of the lens barrel illustrated in FIG. 1 when cut along a B-B line.

FIGS. 1, 2, 3 and 4 illustrate a configuration of an interchangeable lens including a lens barrel that is an embodiment of the present invention. FIG. 1 illustrates the lens barrel when viewed from an image side where a mount portion 100 is provided. FIG. 2 illustrates the mount portion 100 and therearound when viewed obliquely. FIGS. 3 and 4 respectively illustrate sectional surfaces of the lens barrel illustrated in FIG. 1 when cut along an A-A line and a B-B line. FIGS. 3 and 4 illustrate an optical axis X of an image-capturing lens unit held by the lens barrel. A direction in which the optical axis X extends is hereinafter referred to as "an optical axis direction". A radial direction and a circumferential direction of the lens barrel are hereinafter referred to as "a barrel radial direction" and "a barrel circumferential direction", respectively.

The mount portion 100 includes a mount member 101 fixed to an image-side end portion (rear end portion) of a fixed barrel 103, which is a base member of the lens barrel, with four screws 101d with an exterior ring 102 disposed therebetween. The mount member 101 is mechanically connectable to a single-lens reflex camera body and a mirror-less camera body (each not illustrated) that are image-capturing apparatuses. The mount member 101 includes a mount surface 101a that is a positioning reference surface in the optical axis direction for the connection to the camera body, and a fitting diameter portion 101b for matching the optical axis X to a center of an image sensor provided in the camera body.

Furthermore, the mount member 101 includes bayonet claws 101c provided at three positions in the barrel circumferential direction on the image side further than the mount surface 101a. The bayonet claws 101c engage with bayonet claws provided in the camera body to connect the interchangeable lens to the camera body and hold the camera body.

In addition, the mount member 101 includes an electrical contact component 104 with screws (not illustrated). The electrical contact component 104 is electrically connected to an electrical circuit board 105 through a flexible printed wiring board 107. The electrical contact component 104 includes multiple terminals 104a for performing communication with the camera body and for receiving power supply from the camera body. The electrical circuit board 105 controls actuators that drive an aperture stop and a focus lens in the interchangeable lens.

The final lens 106 disposed at a most image-side position among multiple lenses constituting the image-capturing lens unit is fixed to and held by the mount member 101 by heat swaging. The interchangeable lens in this embodiment moves, among the multiple lenses constituting the image-capturing lens unit, a magnification-varying lens in the optical axis direction to perform variation of magnification, and moves a focus lens in the optical axis direction to perform focusing. On the other hand, the final lens 106 is always unmoved (fixed).

Moreover, in the mount member 101, at multiple (two in this embodiment) positions in the barrel circumferential direction in an outer circumferential portion 101g surrounding an image-side lens surface 106a of the final lens 106, protective protrusion portions 101e are provided so as to protrude to the image side further than the image-side lens surface 106a. Image-side ends 101f of the protective protrusion portions 101e are always located on the image side further than an apex of the image-side lens surface 106a of the final lens 106. This configuration enables, when a user stands the interchangeable lens with the mount portion 100 down on a desk, a table or the like, causing the image-side ends 101f to contact the desk or the like, and thereby enables preventing the image-side lens surface 106a of the final lens 106 from contacting the desk or the like.

This embodiment provides, as illustrated in FIGS. 2 and 3, the protective protrusion portions 101e at two positions on both sides (in the barrel radial direction) across the optical axis X of the mage-capturing lens unit. More specifically, as illustrated in FIGS. 1 and 4, the protective protrusion portions 101e are provided so as to be located at upper and lower positions in a normal position image capturing (that is, image capturing in a state where long sides of an imaging surface of the image sensor horizontally extend). This is because, since the imaging surface of the image sensor has a horizontally long rectangular shape, arranging the protective protrusion portions 101e at positions away from light rays entering the imaging surface can reduce an influence of an unnecessary light (such as ghost) reflected by inner circumferential surfaces of the protective protrusion portions 101e on image capturing.

Figure 5:
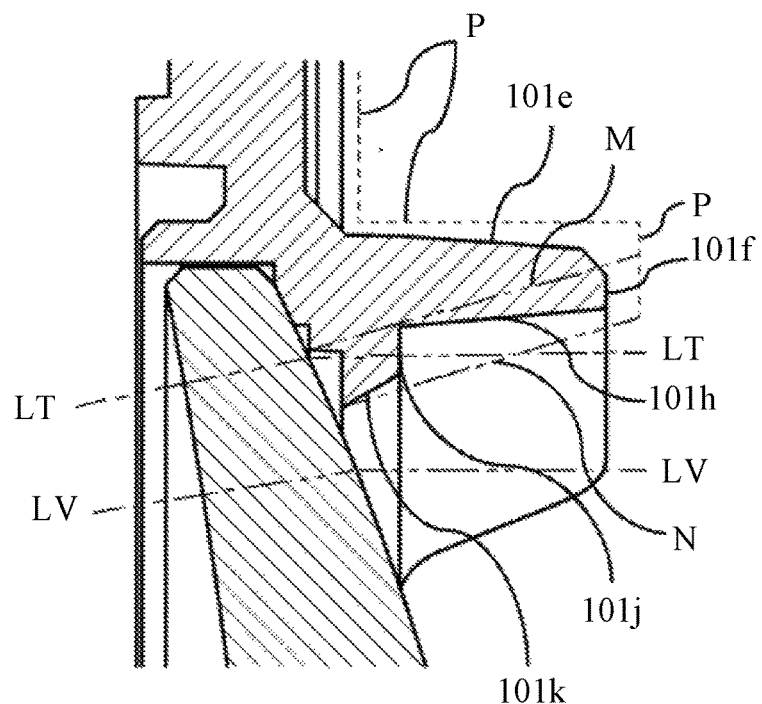
FIG. 5 is an enlarged view of a protective protrusion portion illustrated in FIG. 3.

FIG. 5 is an enlarged view of the protective protrusion portion 101e illustrated in C portion in the sectional view of FIG. 3. Furthermore, FIG. 6 is an enlarged view of the final lens 106 and therearound illustrated in D portion in the sectional view of FIG. 4.

Figure 6:
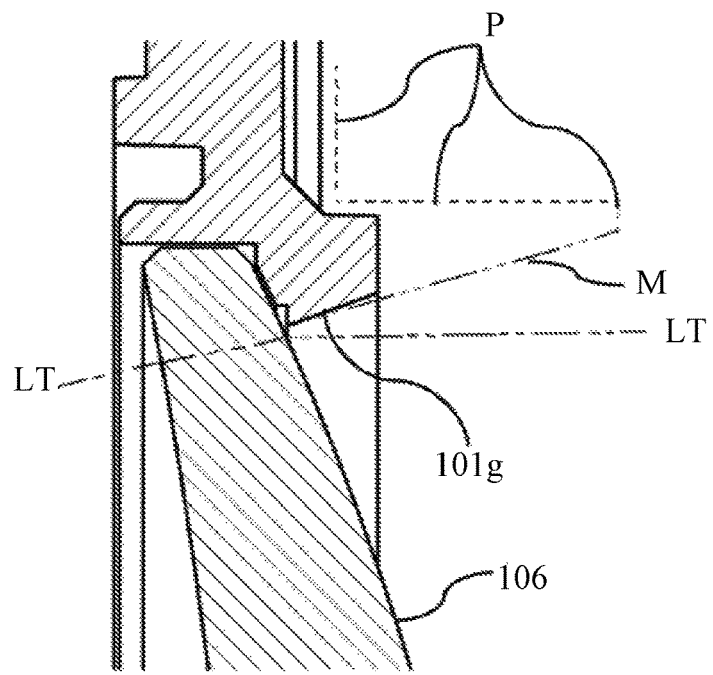
FIG. 6 is an enlarged view of a final lens and therearound illustrated in FIG. 4.

In FIGS. 5 and 6, an effective light ray LT is an outermost light lay of light rays entering the imaging surface in the barrel radial direction. In other words, the effective light ray LT is a radially outermost light lay. This effective light ray LT normally enters a diagonal end of the imaging surface. As illustrated in the B-B sectional surface of FIG. 6, the above-described outer circumferential portion 101g is located further outside than the effective light ray LT. That is, the outer circumferential portion 101g is located so as not to block radially outermost light rays (including the effective light ray LT) entering the imaging surface.

Furthermore, in FIG. 6, among light rays traveling from a frontmost lens disposed at a most object side position of the image-capturing lens unit, a maximum angle incident light ray M is a light ray that passes through inside the outer circumferential portion 101g and has a maximum angle relative to the optical axis X. The outer circumferential portion 101g is set with an angle such that the maximum-angle incident light ray M does not hit its inner circumferential surface.

On the other hand, as illustrated in FIG. 5, an inner circumferential surface 101h of the protective protrusion portion 101e is located further inside than the effective light ray LT in the barrel radial direction. However, the imaging surface has a rectangular shape, and therefore upper and lower effective light rays LV pass through an area further inside than the right and left effective light rays LT. Thus, the inner circumferential surface 101h does not block the light rays entering the imaging surface as long as it is located further outside than the upper and lower effective light rays LV.

In FIG. 1, a rectangular frame L indicates an area (hereinafter referred to as "an optical effective area") through which the effective light rays pass near the final lens 106. The optical effective area has a shape close to that of the imaging surface (rectangle) in the vicinity of the mount portion 100 near the imaging surface, and has a shape closer to a circular shape as approaching the frontmost lens.

However, if the maximum angle incident light ray M is reflected by the inner circumferential surface 101h of the protective protrusion portion 101e, the reflect light becomes an unnecessary light such as ghost. In order to reduce generation of such an unnecessary light, as illustrated in FIGS. 1, 2 and 5, this embodiment provides, to the mount member 101, light-shielding protrusion portions 101j as light-shielding portions.

The light-shielding portions 101j are provided at inside portions of the respective protective protrusion portions 101e in the barrel radial direction in the mount member 101. The light-shielding protrusion portions 101j shield light entering the image-capturing lens unit from the frontmost lens and then passing through the image-side lens surface 106a of the final lens 106 toward the inner circumferential surfaces 101h of the protective protrusion portions 101e. Each of the light-shielding protrusion portion 101j is provided so as to have, as illustrated in FIG. 5, a shape continuous to the protective protrusion portion 101e.

Furthermore, an inner circumferential surface 101k of the light-shielding protrusion portion 101j has a shape being located further outside in the barrel radial direction toward the image side (that is, with distance from the image-side lens surface 106a of the final lens 106 toward the image side. Forming the light-shielding protrusion portion 101j such that its inner circumferential portion has an edge shape including the above-described inner circumferential surface 101k enables, while reducing generation of the unnecessary light, preventing a maximum angle incident light ray N passing near the inner circumferential surface 101k from being reflected thereby.

Moreover, the inner circumferential surface 101k is located in the barrel radial direction such that the maximum angle incident light ray N does not hit the inner circumferential surface 101h of the protective protrusion portion 101e and is not reflected thereby.

FIGS. 5 and 6 illustrate, by a broken line P, an area used exclusively by the mount portion 100 of the interchangeable lens. This area (hereinafter referred to as "a lens-side usable area") P is a space where components of the interchangeable lens can be disposed, and is set depending on the camera body.

If the lens-side usable area P is sufficiently large, it is possible to extend the entire outer circumferential portion 101g illustrated in FIG. 6 toward the image side to the same height as that of the image-side end 101f and to provide a ring-shaped or a cylindrical protective protrusion portion surrounding the image-side lens surface 106a of the final lens 106. However, miniaturizing the interchangeable lens together with the camera body or decreasing a distance from the final lens 106 to the image sensor in the mirror-less camera body narrows the lens-side usable area P.

In the interchangeable lens of this embodiment, in order to provide a ring-shaped or cylindrical protective protrusion portion extending over the whole circumference in the barrel circumferential direction, it is necessary to provide the protective protrusion portion in an area surrounded by the image-side usable area P and the maximum angle incident light ray M as illustrated in FIG. 6. In this case, it is impossible to give a sufficient strength to the protective protrusion portion. Furthermore, the image-capturing optical system is designed such that the effective light ray LT passing through the final lens 106 passes further outside in the barrel radial direction, which also makes it impossible to provide the protective protrusion portion extending over the whole circumference.

Therefore, this embodiment provides, at least one portion in the barrel circumferential direction in the mount member 101, a non-protrusion area 101m where the protective protrusion portion 101e is not provided. Specifically, the non-protrusion area 101m is located at right and left sides in the normal position image capturing illustrated in FIGS. 1 and 4.

In addition, areas corresponding to the non-protrusion areas 101m in the mount member 101 are non-light-shielding areas 101n where the light-shielding protrusion portions 101j are not provided in the barrel circumferential direction. The light-shielding protrusion portions 101j protrude inward in the barrel radial direction further than inner circumferential edges of the non-light-shielding areas 101n (that is, than the inner circumferential surface of the outer circumferential portion 101g).

This embodiment enables, even when the space usable for the interchangeable lens (lens barrel) whose final lens 106 protrudes to the image side further than the mount surface 101a is small, providing the protective protrusion portions 101e each having a sufficient size and a sufficient strength without blocking the effective light rays. Furthermore, providing the light-shielding protrusion portions 101j inside the protective protrusion portions 101e enables reducing generation of ghost or the like due to light reflection at the inner circumferential surfaces 101k of the protective protrusion portions 101e.

Although this embodiment described the case of providing the protective protrusion portion 101e and the light-shielding protrusion portion 101j to the mount member 101, the protective protrusion portion and the light-shielding protrusion portion may be provided to another member constituting the mount portion 100 together with the mount member 101 (for example, a member held by the mount member 101).

Furthermore, although this embodiment described the case where the final lens 106 is unmoved, the final lens may be movable. Moreover, although this embodiment described the case where the edge of the inner circumferential portion of the light-shielding protrusion portion 101j has a circular-arc shape extending in the barrel circumferential direction, the edge of the inner circumferential portion of the light-shielding protrusion portion may have a linear shape corresponding to the optical effective area.

Figure 7:
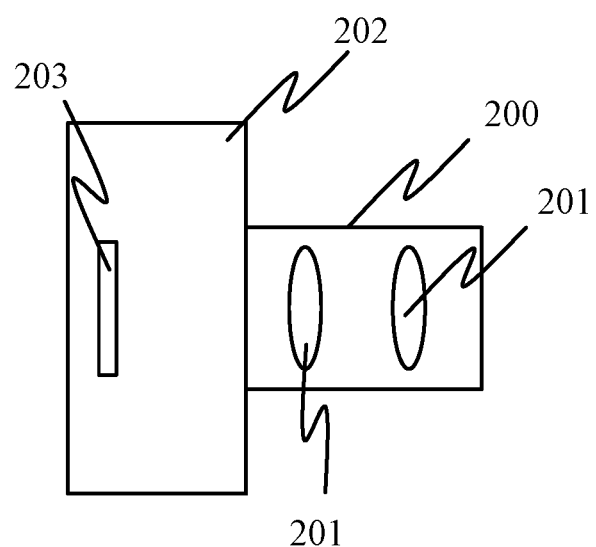
FIG. 7 illustrates an image-capturing apparatus provided with the lens barrel of the embodiment.

In addition, the lens barrel described in this embodiment can be used for an image-capturing apparatus as illustrated in FIG. 7. The image-capturing apparatus illustrated in FIG. 7 includes a camera body 202 provided with an image sensor 203, and a lens apparatus 200 that is mounted to the camera body 202 and includes multiple lenses 201. This lens apparatus 200 includes the lens barrel of this embodiment. The lens apparatus 200 may be detachably attachable to the camera body 202.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-177220, filed on Sep. 12, 2016, which is hereby incorporated by reference herein in its entirety.

What is claimed is:

1. A lens barrel comprising:
   an image-capturing lens unit;
   a mount portion including a mount member including a plurality of bayonet claw portions, the mount member being connectable to an image-capturing apparatus; and
   a plurality of protective protrusion portions, different from the bayonet claw portions, provided in the mount portion at multiple positions in a circumferential direction of the lens barrel, each protective protrusion portion protruding to an image side further than an image-side lens surface of a final lens disposed at a most image-side position in the image-capturing lens unit,
   wherein the mount portion includes, inside the protective protrusion portions in a radial direction of the lens barrel, a plurality of light-shielding portions capable of shielding light passing though the image-side lens surface toward inner circumferential surfaces of the protective protrusion portions,
   wherein the protective protrusion portions extend in an optical axis direction of the image-capturing lens unit and the circumferential direction, and
   wherein the bayonet claw portions extend in the radial direction and the circumferential direction.

2. A lens barrel according to claim 1, wherein:
   the mount portion includes a non-light-shielding area where the light-shielding portion is not provided in the circumferential direction; and
   each of the light-shielding portions protrudes inward further than an inner circumferential edge of the non-light-shielding area in the radial direction.

3. A lens barrel according to claim 1, wherein the protective protrusion portions and the light-shielding portions are respectively provided on both sides across an optical axis of the image-capturing lens unit.

4. A lens barrel according to claim 3, wherein the protective protrusion portions and the light-shielding portions are respectively provided so as to be located at one side and other side of a line parallel to a longer side of an imaging surface of an image sensor provided in the image-capturing apparatus and passing through an optical axis of the image-capturing lens unit when viewed from an optical axis direction of the image-capturing lens unit in a state that the lens barrel is connected to the image-capturing apparatus.

5. A lens barrel according to claim 1, wherein:
   the protective protrusion portions and the light-shielding portions are provided in one member of the mount member and another member constituting the mount portion together with the mount member; and the light-shielding portion is provided in the one member so as to have a shape continuous to the protective protrusion portion.

6. A lens barrel according to claim 1, wherein the final lens is held by the mount member.

7. A lens barrel according to claim 1, wherein a most image-side end of the protective protrusion portion always protrudes to the image side further than the image-side lens surface.

8. A lens barrel according to claim 1, wherein an inner circumferential surface of each of the light-shielding portion has a shape being located further outside in the radial direction with distance from the image-side lens surface toward the image side.

9. An image-capturing apparatus comprising: a lens barrel;
an image-capturing lens unit held by the lens barrel; and
a camera body holding an image sensor, wherein the lens barrel comprises:
a mount portion including a mount member including a plurality of bayonet claw portions, the mount member connectable to an image-capturing apparatus; and
a plurality of protective protrusion portions, different from the bayonet claw portions, provided in the mount portion at multiple positions in a circumferential direction of the lens barrel, each protective protrusion portion protruding to an image side further than an image-side lens surface of a final lens disposed at a most image-side position in the image-capturing lens unit, wherein the mount portion includes, inside the protective protrusion portions in a radial direction of the lens barrel, a plurality of light-shielding portions capable of shielding light passing though the image-side lens surface toward inner circumferential surfaces of the protective protrusion portions, wherein the protective protrusion portions extend in an optical axis direction of the image-capturing lens unit and the circumferential direction, and wherein the bayonet claw portions extend in the radial direction and the circumferential direction.

* * * * *